INVENTORS
CHARLIE N. FRENCH
RICHARD H. ROSBACK
BY
Richard G. Geib
ATTORNEY

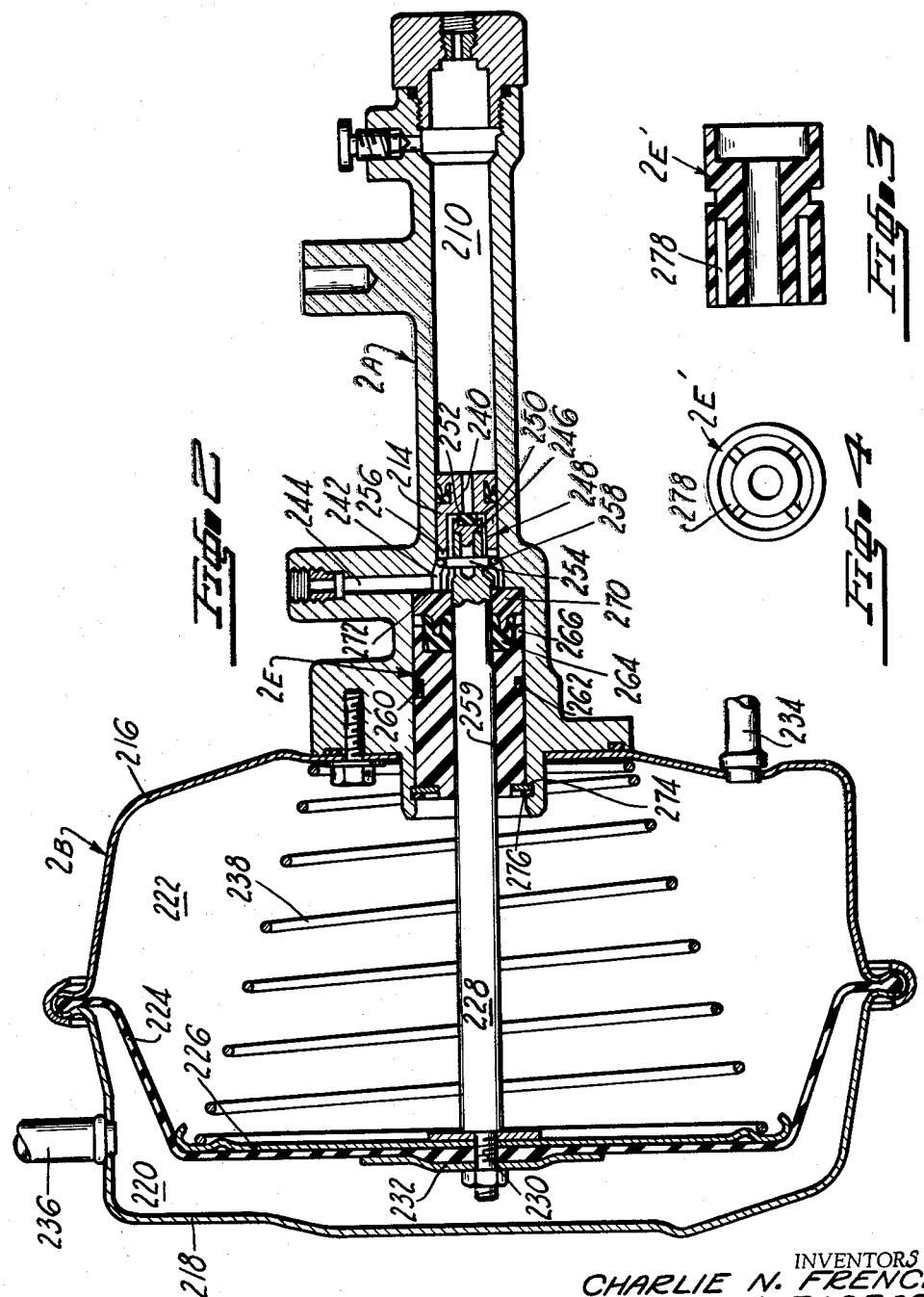

3,143,927
PLASTIC GUIDE FOR DIAPHRAGM
Charlie N. French and Richard H. Rosback, South Bend, Ind., assignors to The Bendix Corporation, South Bend, Ind., a corporation of Delaware
Filed June 4, 1962, Ser. No. 199,827
3 Claims. (Cl. 91—376)

The present invention relates to guide structures, or bearings, for reciprocating mechanisms, and is a continuation-in-part of our copending application Serial No. 10,640, filed February 24, 1960, now abandoned.

It has been found that the ordinary machined surfaces of phenol formaldehyde resins cannot be used to provide any appreciable service life for the support of reciprocating structures. On the other hand machined surfaces of some thermo-setting resins, such as nylon and delron, can be used for bearings; in which case it has been known that there is a minute transfer of the thermal plastic resin onto the opposing surface, and that this phenomenon is beneficial in providing suitable rubbing surfaces. The same phenomenon however does not take place with the phenol formaldehyde resins, and for this reason no appreciable service life has been obtained heretofore with such materials.

According to principles of the present invention however, it has been discovered that extremely smooth surfaces of phenol formaldehyde material i.e. surfaces as are produced when the material is polished or molded will provide extremely long service life if a predetermined unit bearing pressure is not exceeded. The roughness of the phenol formaldehyde bearing surface can vary somewhat depending on application and load; and for large diameters and small unit loadings, a surface not exceeding approximately 80 R.M.S. will be acceptable, while for small diameter rods and the like, any surface finish smoother than approximately 40 R.M.S. will be necessary. According to further principles of the present invention it has been established that while very smooth machine surfaces can be used in some instances, a marked degree in improvement is obtained from a molded phenol formaldehyde resin surface, and more particularly by a compression molded phenol formaldehyde resin surface; inasmuch as these surfaces are not only considerably smoother, but have a dense tough skin which is particularly beneficial. The fact that the thermo-setting resins transfer to the opposing surface during rubbing action, while the phenol formaldehyde resins do not, is believed to explain why the smoothness of the surface is critical for the phenol formaldehyde resin material while it is not with the thermal plastic resins. While we do not completely understand all of the differences in the phenomenon that is involved, we believe that the thermal plastic resins are semi-lubricant in that the roughness imparted by machine surfaces aids in the retention of a film of these thermal plastic resins on the metal surface of the bearing structure. We believe that the very smooth surfaces of the thermo-setting resins, of which phenol formaldehyde is a good example, and particularly the molded surfaces thereof, operate on an entirely different principle wherein they depend upon the adhesion, or adherence, or retention of a liquid lubricant thereon. The need for a smooth surface is necessary in order to provide a guide bearing of a thermo-setting resin in order to induce and spread and hold a thin continuous surface of lubricant for supporting the opposing sliding surface. For this reason a roughness in either the resin surface, or the opposing sliding metal surface, breaks down this film, so that the bearing structure is quickly roughened and worn away. We have observed that once a roughening of the surface is produced, failure of the phenol formaldehyde bearing surface quickly ensues.

Inasmuch as oil bearing surfaces for reciprocating structures must be non-tapered, the molding of guide bearing surfaces has been impossible with conventional bearing materials that have been used heretofore. Thermal plastic materials such as nylon and delron are generally sticky at elevated temperatures and require angles of taper in order to be capable of being removed from a mold; and the needed angles of taper are considerably greater than can be tolerated in reciprocating structures. What is more, thermal plastic materials undergo large amounts of shrinkage during cooling which may in addition be uneven, so as to make it generally impossible to mold these materials into reciprocating guide structures. Phenol formaldehyde resins, however, can be withdrawn from molds having no taper after having been formed in the mold, and what is more can be thereafter inserted on chill pins to provide an accurately shaped and smooth surface which does not need to be, and should not be, machined before use as a guide bearing surface. There appears to be adhesive forces between oil lubricants and the smooth surfaces of the phenol formaldehyde resins which maintain a film of lubricant with these structures. On the other hand, it appears that the thermal plastic materials are more poorly wetted by oils and that oil must be continually fed to the thermal plastic material or its film of oil becomes broken. As far as we are aware, the prior art has not taught that a guide bearing of a phenol formaldehyde plastic material is capable of being produced; and what is more important the phenomenon by which such a structure operates, or the conditions which must be met in order for the structure to operate, are not taught by the prior art.

The phenol formaldehyde resin materials which are commercially available for the molding industry generally include fillers of one form or another such as organic fiber fillers, such as rag, etc., to increase tensile strength, and others may also include granular fillers such as talc, graphite, wood flour, etc., to cheapen the material and provide various secondary properties such as dimensional stability, thermal expansion, etc. It will be understood that by the term phenol formaldehyde materials, we mean to include all of such materials that include a phenol formaldehyde resin binder. Inasmuch as the resin binder imparts the primary characteristics of the material; it will be further understod that these materials may have differences in secondary characteristics as will be well understood by those skilled in the art which would cause a particular phenol formaldehyde material to have advantages for one application and another phenol formaldehyde material to be more suited for another application. The materials of a group, however, are thermo-setting in nature and provide the smooth hard molded surface that is necessary for bearing structures of the present invention.

A principal object of the present invention therefore is the provision of a new and improved guide bearing structure which is more simple, and more economical to produce than the types of guide bearing structures which have been used heretofore.

One large use for reciprocating guide structures is found in the pulsating type of fluid pressurizing cylinder that is used to actuate the hydraulic braking systems of automotive vehicles.

In the earliest type of power braking system which was used commercially, pressure from the master cylinder of the system was delivered to a fluid pressure servomotor driven fluid pressure intensifying unit which intensified the hydraulic pressure from the master cylinder and delivered the intensified pressure to the wheel cylinders of the braking system. Most of the servomotor fluid pressure intensifying units which were produced employed a power piston having a relatively rigid leather seal in its periphery, which not only provided a seal with respect to the sidewalls of the power chamber, but which carried the weight of and guided the power piston throughout its stroke. Some of the later units of this type which were produced employed a diaphragm type of movable wall which was supported by means of a piston rod which entered the unit's hydraulic chamber. The piston rod, of course, moved through a hydraulic seal; and in order that the piston rod would not become cocked in the seal due to the weight of the power piston, the unit was lengthened so that the piston rod would be received in a slide bearing having a length of 1½ to 1¾ inches—which guide bearing was positioned adjacent the hydraulic seal. While the cocking moment in the seal is reduced to a tolerable level, a considerable amount of friction and wear is inherent in its design.

A further object of the present invention therefore is the provision of a new and improved type of guide bearing for reciprocating piston rods as for example those used in the power braking structures above referred to.

In a more recent design of power braking unit, the hydraulic master cylinder is fastened directly to one end of the fluid pressure servomotor so that its hydraulic piston is only a few inches away from the power piston or movable wall of the servomotor. These units are manufactured and assembled on a mass production basis, and a certain amount of misalignment therefore occurs between the master cylinder and the servomotor in each of the units. The units must therefore be so constructed that each can accommodate the maximum amount of misalignment that can possibly occur due to stack-up of tolerances in the production and assembly of the units.

In the latter type of unit above described, the power piston rod is forced through a hydraulic seal which will accommodate a slight amount of angular movement to displace fluid from the master cylinder. A more recent development on the part of the automotive industry has been the desire to provide more interchangeability between the components of a manually actuated hydraulic braking system and those of a power actuated hydraulic braking system; and in this connection the fluid pressure servomotor unit is bolted directly on and is used to actuate the conventional type of master cylinder. The earliest units of this type which were produced commercially employed a diaphragm type of power piston. In order to support the piston, it was necessary to replace the hydraulic piston in the conventional master cylinder with one which would tightly receive the piston rod of the power unit and thereby support the weight of the movable elements of the servomotor unit. A disadvantage of this type of construction was that it did not provide complete interchangeability of the master cylinders which were used in the manually and in the power actuated braking systems.

A still further object of the present invention is the provision therefore of a new and improved fluid pressure motor employing a diaphragm type of power piston and which need not be supported by means of its piston rod and which includes an inexpensive guide bearing that centers and locates the diaphragm structure.

The invention resides in the use of certain materials and methods of making the same to provide certain surface characteristics which are believed to provide lubrication for rubbing contact by reason of certain phenomenon; and further objects and advantages of the present invention will become apparent to those skilled in the art to which it relates from the following description of several preferred embodiments described with reference to the accompanying drawings forming a part of this specification, and in which:

FIGURE 1 of the drawings is a cross-sectional view of a fluid pressure servomotor driven master cylinder employing a guide structure that embodies principles of the present invention;

FIGURE 2 is a longitudinal cross-sectional view of a hydraulic fluid pressurizing device for actuating the brakes of an automotive vehicle, and which also includes a guide structure embodying principles of the present invention;

FIGURE 3 is another embodiment of the guide structure seen in FIGURE 2; and

FIGURE 4 is an end view of the guide structure shown in FIGURE 3.

Figure 1:
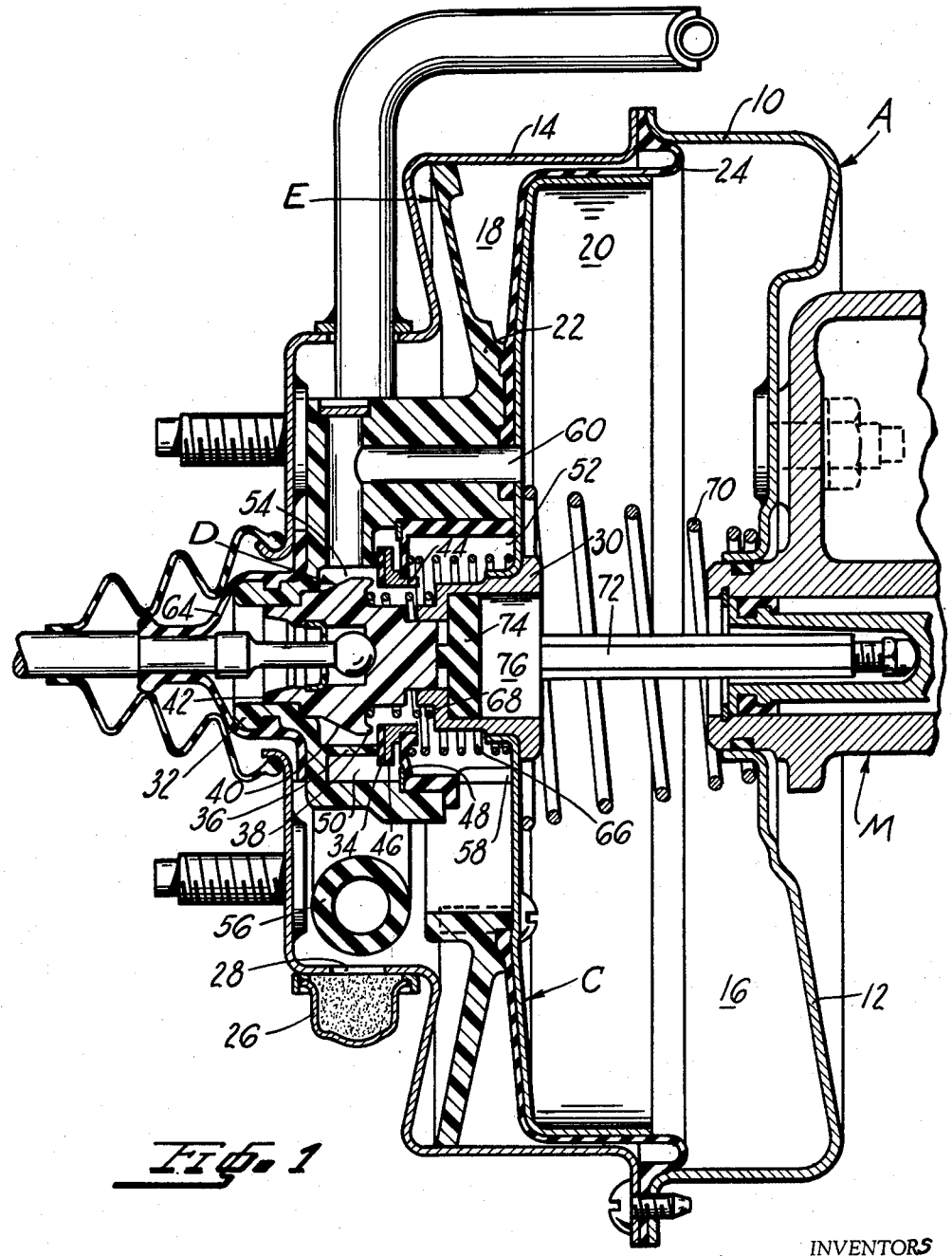

The servomotor driven master cylinder unit shown in FIGURE 1 generally comprises a fluid pressure servomotor A having a master cylinder M bolted to its forward (or right hand) end, as seen in the drawing. The housing 10 of the fluid pressure servomotor A is formed by two generally cup-shaped stampings 12 and 14 which form an internal chamber that is divided into a forward opposing power chamber 16 and a rear opposing power chamber 18 by means of a curtain diaphragm type of movable wall or power piston C.

The movable wall C is also formed by means of front and rear half sections 20 and 22 respectively, and is completed by a curtain diaphragm 24—the radially inner portion of which is clamped between the front and rear half sections 20 and 22 of the movable wall, and the radially outer portion of which is clamped between the front and rear sections 12 and 14 of the housing 10.

The servomotor A, shown in the drawing is of the atmospheric submerged type in which, during the normal deenergized condition of the servomotor, atmospheric pressure is communicated to both of the front and rear opposing power chambers 16 and 18 respectively, and in which actuation is had by communicating vacuum to the front opposing power chamber 16. Atmospheric pressure is continually communicated to the rear opposing power chamber 18 through the air filter 26 and opening 28 in the housing section 14; and the regulation of vacuum to the front opposing power chamber 16 is had by means of a control valve structure D that is formed within the rear half section 22 of the movable wall C.

The front piston section 20 is formed by a generally cup-shaped stamping whose outer cylindrical surface is spaced generally radially inwardly from the sidewalls of the housing 10, and over which the curtain diaphragm 24 is positioned. The center portion of the stamping 20 has been pierced and drawn to provide an axially rearwardly extending flange into which an annular bushing 30 is pressed. The rear piston section 22 is a cast plastic piece which forms the various valve passages and chambers, and the rear end of which terminates in an axially extending cylindrical boss 32. The vacuum valve seat 34 for the valve is formed by the forward end of an axially located and forwardly extending annular partition 36 in the rear piston section 22; and the atmospheric valve seat 38 is formed by the forward end of a cup-shaped flange 40 that is carried by the manually moved control element 42 of the valve. The control element 42 is also a cast plastic part whose forward end is received in the axially extending opening 43 of partition 30, and whose rear end is slidingly received in the axially extending outer opening of the rear piston section 22. The annular space between the control element 42 and the cast opening of the rear piston section 22 is divided into the various valve chambers by means of an annular poppet member 44 of a U-shaped cross section. The rear flange 46 of the annular poppet member 44 is relatively rigid and is adapted to be abutted by both the atmospheric and vacuum valve seats 38 and 34 respectively, and its front flange 48 is formed by means of a flexible diaphragm whose radially outer portion seals with the sidewalls of the cast opening in the rear piston section 22. The annular space isolated by means of the partition 36 and poppet member 44 provides the vacuum chamber 50 for the valve; and space forwardly of the poppet member 44 and atmospheric valve seat 38 forms the atmospheric chamber 52 of the valve; and the annular space between the vacuum valve seat 34 and atmospheric valve seat 38 forms the control chamber 54 of the valve. Vacuum from the manifold of the vehicle's propelling engine is continually communicated to the vacuum valve chamber 50 by means of a flexible conduit 56; atmospheric pressure from the rear opposing power chamber 18 is continually communicated to the atmospheric valve chamber 52 by means of an opening 58 in the rear piston section 22; and control pressure from the control chamber 54 is continually communicated to the front opposing power chamber 16 by means of the passageway 60 that is provided in the piston sections 20 and 22. Axial movement of the control element is had by means of the push rod 62, and a rubber boot 64 prevents leakage from the control chamber 54 past the control element 42. The rear flange 46 of the poppet is suitably coated with rubber for sealing engagement with the atmospheric and vacuum valve seats 34 and 38; and the flange 46 is normally held in engagement with the vacuum valve seat 34 by means of a coil spring 66. Another coil spring 68 is provided to normally hold the atmospheric valve seat 38 out of engagement with the poppet 44 to thereby permit atmospheric pressure to flow to the front opposing power chamber 16 and thereby provide the normal released condition (shown in the drawing) of the unit.

The movable wall C is normally biased into engagement with the rear wall of the housing section 14 by means of a piston return spring 70; and force from the movable wall C is transmitted to the piston of the master cylinder M by means of the piston rod 72. In order that a reaction will be provided against the foot of the operator, a rubber disc is positioned in the counterbored section 73 of opening 43 between the movable wall C and the piston rod 72; so that when force is transmitted through the rubber disc 74, it will be deformed up against the control element 42 in the manner taught in the Earl R. Price application 699,384, filed November 27, 1957, now abandoned. The sidewalls of the counterbore 73 telescope over the cylindrical surface of head 76 as explained in application 699,384 and so form a moment restraining or non-pivotal connection between the movable wall C and piston rod 72.

In the normal condition of the servomotor shown in the drawing, atmospheric pressure from the atmospheric valve chamber 52 flows past the atmospheric valve seat 38 to the control chamber 54, and thence by means of passageway 60 to the front power chamber 16. Operation of the structure so far described is initiated by movement of the push rod 62 to the right—whereupon the atmospheric valve 38 is moved into engagement with the poppet 44 to close off atmospheric communication with the rear opposing power chamber 16, and still further movement to the right lifts the flange 46 from the vacuum valve seat 34 to communicate vacuum to the front opposing power chamber 16. Introduction of vacuum to the front chamber 16 causes the movable wall C to move to the right and follow the movement of the push rod 62; and when movement of the push rod 62 is terminated, a slight initial removal of pressure from the chamber 16 causes the vacuum valve seat 38 to again abut the poppet 44 and thereby prevent further movement of the movable wall C. Movement of the movable wall C is transmitted through the rubber disc 74 to the cylindrical head 76 of the piston rod 72 to thereby pressurize the fluid in the master cylinder M. Resistance to movement of the piston in the master cylinder causes the rubber disc 74 to be deformed against the control element 42, to thereby provide a reactive force upon push rod 62 which is indicative of the amount of force being delivered to the master cylinder M.

A reduction of force upon the push rod 62 permits the rubber disc 74 to bias the control element 42 to the left, to thereby move the atmospheric valve seat 38 out of engagement with the poppet 44, and thereby permit air to flow to the front power chamber 16. Air flow to the power chamber 16 decreases the pressure differential across the movable wall C and the force of the hydraulic pressure in the master cylinder coupled with the force of the piston return spring 70 causes the movable wall C to move rearwardly. Rearward movement continues so long as the push rod 62 is moved to the left; and when retractile movement of the push rod 62 is stopped, the movable wall C moves rearwardly a sufficient amount to bring the flange 46 of the poppet 44 into engagement with the atmospheric valve seat 38 and thereby valve off further flow of air to the front power chamber 16. Complete removal of force upon the push rod 62 permits the control element 42 to remain in the position shown in the drawing, and air flow to continue to the front power chamber 16 until the movable wall C has moved into the position shown in the drawing.

According to further principles of the present invention, the movable wall C is supported or guided by means of a thermosetting plastic guide, which in the present instance is a condensation product of phenol formaldehyde, and which guide E bears against and slides along the sidewalls of the housing section 10. In some instances the plastic guide E may be fixed to the right hand section 20 of the movable wall C; but in the preferred embodiment shown in the drawing, is a plastic ring affixed to the piston section 22 which is located on the opposite side of the movable wall C from the push rod 72. In the preferred embodiment shown in the drawing, the guide ring E is made integral with, and therefore is made with the same plastic as, the piston section 22; so that the entire movable wall C is formed generally by two piston sections having a diaphragm 24 clamped therebetween. The end of the piston rod 72 is only pivotally supported by the hydraulic piston of the master cylinder M; so that the weight of the movable wall C is supported solely by means of the plastic guide ring E; and so that no cocking movement is produced upon the hydraulic piston of the master cylinder M. It will further be seen that the movable wall C is accurately guided throughout the stroke of its movable wall by the plastic guide E; and experience has shown that there is substantially no wear of the plastic guide E, and that the service life of this construction exceeds the best expectation of that of the above described prior art constructions.

As will be seen from the drawings, the sliding surface of the guide structure E is of large diameter and has a large bearing surface against the sidewalls of the shell section 14. Experience has shown that slightly rougher surface finishes can be tolerated under such conditions than can be tolerated in smaller diameter and more heavily loaded bearing surfaces, as for example those of the embodiment hereinafter to be described. In the embodiment shown in FIGURE 1, for example, the shell 14 has an internal surface finish of from approximately 80 R.M.S to approximately 100 R.M.S such as can be obtained by the conventional "ironing" practices that are used in metal stamping operations; and the opposing sliding surface of the guide structure E has a finish of approximately 25 R.M.S. as formed by a suitable compression molding operation. The mold structure in this instance may leave a slight amount of flash because of the large diameter of the guiding surface, provided however that this flash is suitably removed.

Another embodiment of the guide structure is shown in the hydraulic pressurizing device seen in FIGURE 2 of the drawings and generally comprises a cylinder body 2A having an axially extending cylinder bore 210 therein from which hydraulic fluid is forced through its outlet connection 212 by means of the displacement piston 214. The displacement piston 214 is adapted to be power driven by means of the fluid pressure motor 2B which is suitably bolted to one end of the cylinder body 2A. The fluid pressure motor 2B, shown, is generally formed in two stamped shell sections 216 and 218 which form an internal chamber that is divided into opposing power chambers 220 and 222 by means of a flexible diaphragm 224—the outer periphery of which is suitably sealingly clamped between the shell sections 216 and 218 in the manner shown for example in the Price et al. application Serial No. 842,290. The center section of the diaphragm 224 is suitably stiffened by means of a diaphragm back-up plate 226—by means of which, force is exerted upon the piston rod 228 which extends into the cylinder bore 10 to drive the displacement piston 214. Rod 228 may be fastened to the back-up plate 226 in any suitable manner; and as shown, is provided with the threaded connection 230 and retaining washer 232 by means of which the center section of the diaphragm is sealingly clamped upon the back-up plate 226.

The fluid pressure motor 2B may be of any suitable type, and as shown in the drawings is a vacuum suspended unit in which vacuum of equal intensity is normally communicated to both of the opposing power chambers 220 and 222, and which is caused to be actuated by the admission of atmospheric pressure to the rear opposing power chamber 220. In the unit shown in the drawing, vacuum is continually admitted to the front opposing power chamber 222 through the vacuum inlet connection 234; and control of the unit is had by means of the control conduit 236 that communicates with the rear opposing power chamber 220. The control conduit 236 is connected to a control valve, not shown, which in its normal condition supplies vacuum to the rear opposing power chamber 220, and which when actuated admits atmospheric pressure to the rear opposing power chamber 220. The diaphragm structure is normally biased into the position shown in the drawing by reason of the power piston return spring 238.

In order that the hydraulic chamber 10 will be compensated for loss or changes in volume of the hydraulic fluid in the system which is connected to its outlet port 212, the displacement piston 214 is provided with an axially extending opening or compensating port 240, which, in the normal condition of the parts shown in the drawing, communicates the opposite sides of the displacement piston 214. The rear side of the displacement piston 214 (that is the side forming its follow-up chamber 242) is provided with an external connection 244 by means of which it is communicated to a supply or reservoir of low pressure make-up fluid. The compensating port 240 is adapted to be closed off during power actuation of the unit by means of a poppet member 246 that is positioned in an enlarged or counterbored rear section 248 of the compensating port 240, and the inner end of which forms a shoulder or valve seat 250. The poppet or valve closure member 246 may be formed in any suitable manner, and, as shown in the drawing, is formed by means of a rubber coated tip 252 which is suitably fixed to the forward end of the push rod 228. The push rod 228 projects into the counterbore 248, and is loosely fastened to the piston 214 by means of a cross pin 254—which is tightly pressed into a suitable opening in the push rod 228, and the opposite end of which extends into a slotted opening 256 in the opposite sidewall of skirt section of the piston 214. Sufficient play is provided in the slotted openings 256 so that the valve closure member 252 will be out of sealing engagement with the shoulder 250 when the cross pin 254 engages the rear end of the slotted opening 256, and will be in sealing engagement with the shoulder 250 before the cross pin 254 engages the front end of the slotted opening 256. The cross pin 254 is prevented from coming loose by reason of a snap ring 258 positioned in a groove in the outer surface of the piston 214 in the region overlying the ends of the pin 254.

It will be seen that an appreciable load is asserted upon the end of the push rod 228 by means of the relatively heavy diaphragm structure, and that this load is cantilevered from the guide structure 2E, about to be described. According to principles of the present invention, the guide structure 2E is formed by means of an annular generally cylindrical thermo-setting plastic part having an appreciable axial length, and through the central opening 259 of which the rod 228 slides. The guide structure 2E shown in the drawings is positioned in an enlarged or counterbored section in the rear end of the cylinder bore 210; and a seal is established with respect to the sidewalls of the cylinder bore by means of an O-ring 260 that is seated in a suitable groove 262 in the outside cylindrical surface of the guide structure 2E. In the embodiment shown in FIGURE 2, a sliding seal is formed with respect to the push rod 228 by means of a U-packing 264 which is positioned in the bottom end of an enlarged section 266 of its central opening 259, with the lips of the seal projecting inwardly along the sidewalls of the enlarged opening 266 and rod 228, respectively. The U-packing 264 is held in place by means of a seal retainer 270 which is adapted to abut the end of the guide structure 2E outwardly of the enlarged sections 266, and which has an annular axially extending projection that extends in between the lips of the seal to hold the base of the seal in place. The retainer 270 is positioned against the shoulder 272 formed by the counterbore 259; and the guide structure 2E is held in place by means of an annular retaining washer 274 which abuts the outer end of the sealing structure 2E. The retaining washer 274 may be held in place by any suitable means; and as shown in the drawing, is held in place by means of the snap ring 276 which is fitted into the suitable groove in the sidewalls of the counterbore 259. The guide structure 2E is formed from a molded thermo-setting resin, preferably of the phenol formaldehyde type which as previously explained may contain suitable fillers to form the type of material commonly known as Bakelite. While the word "Bakelite" was coined as a trademark for this type of thermo-setting resin containing a filler, it has become a generally accepted word for this type of material and it will be understood that the materials of any manufacturer can be used, and that any suitable combination of resin and filler can be used as will be well understood by those skilled in the art. It has been found that an appreciable thickness of a tough smooth skin is formed on the mold surfaces of a thermo-setting resin part which has considerably lower wear, and coefficient of friction, than does the inner portion of the thermo-setting resin part.

Inasmuch as the sealing structure shown can be subjected to hydraulic pressures in the neighborhood of approximately 1,000 p.s.i., the O-ring 260 will preferably be positioned approximately in the center section of the guide structure 2E so as to provide a considerable area of the plastic over which shearing forces can be absorbed. In the embodiment shown in FIGURE 2, hydraulic pressure in the chamber 210 causes the piston 214 to return to the position wherein its outer end comes into abutment with the non-metallic retainer 270. After the rear end of the piston 214 abuts the retainer 270, further rearward movement of the push rod 228 causes the poppet 254 to move out of engagement of its seat 250 to open the compensating port 240. Thereafter the pin 254 abuts the rear end of the slotted end 256 to limit further rearward movement of the rod and diaphragm structure.

FIGURE 3 of the drawings shows a plastic guide 2E′, which is identical to the guide 2E shown in FIGURE 2 excepting that four voids 278 have been formed longitudinally thereof for the purpose of reducing the thickness of plastic section which must be cured in the mold.

A special problem is concerned in the application of the guide structure shown in FIGURE 2 in that the guide structure is continually in contact with hydraulic liquids which contain various solvents such as alcohol which will cause a deterioration of the prior art plastic bearing materials that have been used heretofore, such as nylon and delron. Phenol formaldehyde resin is practically inert to these materials and one suitable material which employs a wood-flour filler was soaked for 5 weeks in a hydraulic braking fluid at room temperature without experiencing any measurable change in dimensions.

The bearing structures shown in FIGURES 2, 3 and 4 of the drawings are preferably compression molded in a two piece die which separates longitudinally of the bearing structure and which further includes a smooth surface pin which forms the opening 259 that slidably receives the piston rod 228. With the plastic materials that are used in the present invention, the mold pin need be provided with no more taper, in order to permit the removal of the molded part from the pin, than is normally involved in the tolerance in diameter that is usually allowed for machined bearings; and actually the finished molded parts can be removed from the mold pin when no taper is allowed. This is in contrast to the large angles of taper which must be provided in the molding of the prior art plastic bearing materials with which I am familiar, such as nylon, delron, etc. The phenol formaldehyde bearing structures molded as above described will have surface finishes from about 20 to about 40 R.M.S. for both their rod receiving openings, and their external surfaces; and the piston rods that are adapted to slide in the bearing structures will preferably be ground to a surface finish from about 25 to 40 R.M.S. Experience has shown that parts having approximately these finishes will have a service life of over one million cycles, whereas parts having a rough surface finish, as for example those produced commercially by automatic screw machines, will cause a deterioration of the bearing in less than approximately 100,000 cycles. The surface finish of the piston rod which can be used will vary with the diameter of rod, and length of bearing structure, and further with the unit bearing loads; and in general, the surface finish of the rod should not exceed approximately from about 40 to about 80 R.M.S.

It will be apparent that a new and improved type of guide bearing structure has been produced which not only is more economical to provide, but superior in certain applications to prior art guide bearing for reciprocating structures.

While the invention has been described in considerable detail, I do not wish to be limited to the particular embodiments shown and described; and it is my intention to cover hereby, all novel adaptations, modifications and arrangements thereof which come within the practice of those skilled in the art to which the invention relates.

We claim:

1. A fluid pressure servomotor for driving an axially guided driven member comprising: a housing having an axially extending chamber, said driven member being positioned axially of one end of said housing; a flexible movable wall in said chamber dividing said chamber into opposing power chambers, said flexible movable wall having a driven portion which pivotally abuts said driven member and is nonpivotally connected to said flexible movable wall; valve structure carried by said flexible movable wall for controlling the differential pressure across said flexible movable wall, said valve structure having a force transmitting control element projecting out of the opposite end of said housing from said driven member and whereby actuating force is applied to said driven member; and a plastic guide ring fixed to said flexible movable wall on its side opposite to said driven member and bearing against the sidewalls of said axially extending chamber to overcome lateral forces that are produced on said flexible movable wall by said force transmitting control element.

2. A vacuum powered atmospheric suspended fluid pressure servomotor for driving an axially guided driven member comprising: a housing having an axially extending chamber, said driven member being positioned axially of one end of said housing; a movable wall in said chamber dividing said chamber into an inner opposing power chamber adjacent said driven member for communication with vacuum and an outer opposing power chamber which is open to atmospheric pressure, said movable wall having a driven portion which pivotally abuts said driven member and is nonpivotally connected to said movable wall; valve structure carried by said movable wall for communicating vacuum to said inner chamber, said valve structure having a force transmitting control element projecting out of the opposite end of said housing from said driven member and whereby actuating force is applied to said driven member; and a diaphragm sealingly connected to said housing and clamped to said movable wall by a plastic guide ring, said guide ring bearing against the sidewalls of said axially extending chamber to overcome lateral forces that are produced on said movable wall by said force transmitting control element.

3. A fluid pressure servomotor comprising:
   a housing having an axially extending chamber;
   a flexible movable wall in said chamber dividing said chamber into opposing power chambers, said flexible movable wall having a driven portion connected thereto;
   means for controlling a differential pressure across said flexible movable wall, said means having a force transmitting control element adapted to mechanically operate said driven portion in absence of power to create the pressure differential; and
   a plastic guide ring fixed to said flexible movable wall and bearing against an inner surface of said housing to overcome lateral forces that are produced on said movable wall as by said force transmitting control element.

References Cited in the file of this patent

UNITED STATES PATENTS

| | | |
|---|---|---|
| 2,817,562 | Fleming et al. | Dec. 24, 1957 |
| 2,887,366 | Oberdorter | May 19, 1959 |
| 2,986,125 | Young et al. | May 30, 1961 |
| 2,993,478 | Cripe | July 25, 1961 |
| 3,016,881 | Wilkens et al. | Jan. 16, 1962 |
| 3,027,879 | Price | Apr. 3, 1962 |
| 3,035,551 | Rike | May 22, 1962 |
| 3,049,099 | Price | Aug. 14, 1962 |